United States Patent [19]

Guth et al.

[11] Patent Number: 5,371,307
[45] Date of Patent: Dec. 6, 1994

[54] SILICA/GERMANIUM OXIDE ZEOLITES

[75] Inventors: Jean-Louis Guth, Mulhouse, France; Zelimir Gabelica, Waremme-Oleye

[73] Assignee: Rhone-Poulenc Chimie, Courbevoie, France

[21] Appl. No.: 990,550

[22] Filed: Dec. 14, 1992

Related U.S. Application Data

[63] Continuation of Ser. No. 764,067, Sep. 24, 1991, abandoned, which is a continuation of Ser. No. 332,053, Apr. 3, 1989, abandoned.

[30] Foreign Application Priority Data

Apr. 1, 1988 [FR] France .................. 88 04367

[51] Int. Cl.$^5$ ............... C07C 5/02; C01B 33/20; B01J 29/04
[52] U.S. Cl. .................. 585/250; 585/418; 502/63; 502/64; 423/326; 423/705
[58] Field of Search ............... 502/64, 60, 63; 423/328.2, 335, 326, 705

[56] References Cited

U.S. PATENT DOCUMENTS

| | | | |
|---|---|---|---|
| 3,640,681 | 2/1972 | Pickert | 423/701 |
| 3,702,886 | 11/1972 | Argauer et al. | 423/328 |
| 3,839,539 | 10/1974 | Elliott, Jr. | 423/329 |
| 3,941,871 | 3/1976 | Dwyer et al. | 423/326 |
| 4,061,724 | 12/1977 | Grose et al. | 423/329 |
| 4,073,865 | 2/1978 | Flanigen et al. | 423/329 |
| 4,238,318 | 12/1980 | Kouwenhoven et al. | 423/326 |
| 4,401,637 | 8/1983 | Marosi et al. | 423/329 |
| 4,523,047 | 6/1985 | Chester et al. | 423/277 |
| 4,542,117 | 9/1985 | Morris et al. | 502/66 |
| 4,564,511 | 1/1986 | Desmond et al. | 423/326 |
| 5,171,553 | 12/1992 | Li et al. | 423/351 |

FOREIGN PATENT DOCUMENTS

| | | |
|---|---|---|
| 0034727 | 9/1981 | European Pat. Off. |
| 0054386 | 6/1982 | European Pat. Off. |
| 0137289 | 4/1985 | European Pat. Off. ........ 423/326 |
| 2023562 | 1/1980 | United Kingdom ......... 423/328 |
| 2066230 | 7/1981 | United Kingdom . |

OTHER PUBLICATIONS

Olson et al. "Chemical and Physical Properties of the ZSM-5 Substitutional Series" J. Cat. 61 (1980) 390-396.
French Search Report.

*Primary Examiner*—Anthony McFarlane
*Attorney, Agent, or Firm*—Burns, Doane, Swecker & Mathis

[57] ABSTRACT

Novel calcined zeolites of MFI type, based on silica and germanium oxide, are well adapted for the catalysis, e.g., of hydrogenolysis, hydrogenation and reforming reactions, and have the general formula:

$$(Si_{96-x}Ge_x)O_{192}$$

wherein x ranges from 0.1 to about 36.

37 Claims, No Drawings

SILICA/GERMANIUM OXIDE ZEOLITES

This application is a continuation of application having Ser. No. 07/764,067, filed Sep. 24, 1991, now abandoned, which is continuation of application having Ser. No. 07/332,053, filed Apr. 3, 1989, now abandoned.

BACKGROUND OF THE INVENTION

1. Field of the Invention

The present invention relates to novel zeolites based on silica and germanium oxide, and, more especially, to novel zeolites having an MFI structure and to a process for the synthesis thereof.

2. Description of the Prior Art

Zeolites are crystallized tectosilicates. Their structures are aggregates of $TO_4$ tetrahedrons defining a tridimensional skeleton by the sharing of oxygen atoms. In the aluminosilicate type zeolites, which are the most common, T represents tetravalent silicon and trivalent aluminum. The cavities and channels of molecular dimensions in this skeleton accept cations which compensate for the charge deficit due to the presence of trivalent aluminum in the tetrahedrons. Trivalent elements, such as gallium and more rarely boron or beryllium, may be substituted for the aluminum.

In general, the composition of the zeolites may be represented by the overall formula of $M_{2/n}O$; $Y_2O_3$; $xZO_2$ in the dehydrated and calcined state. Z and Y respectively represent the tetravalent and trivalent elements of the $TO_4$ tetrahedrons; M is an electropositive element having a valence n, such as an alkali or alkaline earth metal element constituting the compensating cations; x may range, theoretically, from 2 to infinity, in which case the zeolite is a silica.

Each type of zeolite has a distinct pore structure. The variations in the dimensions and shapes of the pores from one type of zeolite to another are the principal factors contributing to the differences in the adsorbent properties thereof. Only molecules having certain dimensions and shapes are able to penetrate into the pores of a particular zeolite. In light of their remarkable properties, the zeolites are especially suitable for the purification or separation of gaseous or liquid mixtures, such as, for example, the separation of hydrocarbons by selective adsorption.

The chemical composition and in particular the nature of the elements present in the $TO_4$ tetrahedrons and the nature of the exchangeable compensating cations, are also important factors affecting the selectivity of the adsorption, and particularly the catalytic properties of these materials. They are used as catalysts or catalyst supports in the cracking, reforming and modification of hydrocarbons, as well as in the synthesis of numerous molecules.

Many zeolites exist in nature; these are aluminosilicates, the availability and properties of which do not always satisfy the requirements of industrial applications. For this reason, considerable research has been carried out in quest of products having novel properties. This has resulted in the synthesis of a large variety of zeolites, essentially of the aluminosilicate type. Among the numerous examples of this type, the following are representative: zeolite A (U.S. Pat. No. 2,882,243); zeolite X (U.S. Pat. No. 2,882,244); zeolite Y (U.S. Pat. No. 3,130,007); zeolite L (FR 1,224,154); zeolite T (FR 1,223,775); zeolite ZSM5 (U.S. Pat. No. 3,702,886); zeolite ZSM12 (U.S. Pat. No. 3,832,444); zeolite ZSM48 (EP 0,015,132).

Synthetic zeolites containing germanium in the $TO_4$ tetrahedrons are also known to this art. Tetravalent germanium may be either partially or completely substituted for the tetravalent silicon.

A trivalent element, such as aluminum or gallium, is thus always present in the tetrahedrons, in addition to the tetravalent elements. The following combinations, containing germanium in the $TO_4$ tetrahedrons of the skeleton are known to the art: $(Si^{IV}, Ge^{IV}, Al^{III})$; $(Si^{IV}, Ge^{IV}, Ga^{III})$; $(Ge^{IV}, Al^{III})$; and $(Ge^{IV}, Ga^{III})$. In this respect, compare the publication by R. M. Barrer, J. W. Baynham, F. W. Bulktude and W. M. Meier in *J. Chem. Soc.* (1959) and the patents relating to faujasite (BE 798,818), NU-27 (EP Application No. 131,320), EU-7 (EP Application No. 107,908), EU-13 (EP Application No. 108,486), NU-10 (EP Application No. 77,624), NU-5 (EP Application No. 54,386), NU-6 (EP Application No. 54,364), NU-2 (EP Application No. 55,046), FU-9 (EP Application No. 55,529), NU-13 (EP Application No. 59,540), NU-3 (EP Application 40,016), SSZ-15 (U.S. Pat. No. 4,610,854), ZSM-5 (U.S. Pat. No. 3,702,886), ZSM-5 (EP Application No. 34,727) and ZSM-5 (FR 2,472,538).

Zeolites in which the silicon is substituted by germanium in the absence of trivalent elements, i.e., the $TO_4$ tetrahedrons contain only the (Si, Ge) couple, have not to date been proposed to this art.

The zeolites are typically prepared from a reaction mixture which is converted in a hydrothermal medium and by a dissolution/recrystallization process, the crystalline precipitate which results being calcined after separation and drying, to yield an active zeolite.

The reaction mixture contains reagents designed to supply the elements T to be incorporated into the skeleton of the zeolite, such reagents typically being aqueous gels containing oxides or hydroxides of the elements T.

The reaction mixture also contains one or more mobilizers favoring the dissolution of said reagents and transfer from the aqueous phase to the zeolite crystals being formed, and a structuring agent which gives rise to the formation of micropores, and which also stabilizes the zeolite.

If $OH^-$ anions are used as the mobilizing agent, the reaction media are characterized by a basic pH, typically higher than 10. These media are well suited for the dissolution of starting materials containing the elements of silicon and aluminum, and, in general, all of the elements yielding oxygen anions soluble in a basic medium.

If strong bases are used, such as the hydroxides of alkali metals, highly supersaturated media are obtained which makes possible the rapid crystallization of zeolites. But it is often difficult to control the formation of the desired crystallized phase, which, in most cases, is metastable. On the other hand, a high rate of crystallization may lead to the formation of defects in the skeleton of the $TO_4$ tetrahedrons, such as $-T-O^-$ instead of $-T-O-T-$. Finally, the presence of compensating alkaline cations in the channels and cavities is frequently detrimental in certain applications; it may then be necessary to conduct an ion-exchange with other cations. The latter disadvantage may be avoided by replacing these bases with other strong bases, such as alkylammonium hydroxides, which may simultaneously act as structuring agents. However, the high cost of these materials limits their use on an industrial scale. The use of weaker bases, such as the amines, which also have structuring properties, largely eliminates the aforementioned difficulties. But in this case, the concentration in OH⁻ mobilizer anions may become too low, which leads to excessively slow reaction rates.

It is also possible to employ fluoride anions F⁻ as a mobilizing agent of elements yielding soluble fluorine complexes.

The usable pH range is extended in this case toward neutral or even acidic pH values. The selection of cations that may be used in the reaction medium is also larger, as it may include cations such as NH4+, which are easily eliminated after the synthesis by calcination.

SUMMARY OF THE INVENTION

A major object of the present invention is the provision of novel zeolites based on silica and germanium oxide having the following general formula, after calcination:

$$(Si_{96-x}Ge_x)O_{192}$$

in which X ranges from 0.1 to about 36.

DETAILED DESCRIPTION OF THE PREFERRED EMBODIMENTS OF THE INVENTION

More particularly according to the present invention, the subject novel zeolites belong to the pentasil class and to the class of zeolites of the MFI structural type. They are designated germanozeosilites.

The zeolites of the invention display a monoclinic crystalline structure and show the X-ray diffraction pattern set forth in Table I below.

In this table, the extreme values of the reticulate lattice constants $d_{hkl}$ are reported and they correspond to the concentration limits of the germanium incorporated in the skeleton of the zeolite, or more precisely to the Ge/(Si+Ge) ratio.

Indeed, identification of zeolites of MFI structure is specifically and advantageously done by determining their X-ray diffraction pattern.

This diffraction pattern may be obtained from powders using a diffractometer in conventional manner, by means of the K radiation of copper. From the position of the diffraction peaks represented by the 2Θ angles, via the Bragg equation, the characteristic $d_{hkl}$ lattice constants of the specimen may be calculated. The measurement error, $\Delta(d_{hkl})$ over $d_{hkl}$, is calculated by the Bragg equation as a function of the absolute error $\Delta(2\Theta)$ affecting the 2Θ measurement. An absolute error of $\Delta(2\Theta)$ equal to ±0.2° is presently assumed. The relative intensity I/Io allocated to each value of $d_{hkl}$ is estimated from the height of the corresponding diffraction peak. An arbitrary scale is used to characterize this intensity: FF=very strong, F=strong, mF=medium to strong, m=medium, mf=medium to weak, f=weak, ff=very weak.

The value of the volume $V_o$ of the crystallographic lattice of the zeolites according to the invention is a function of the substitution of germanium for silicon.

In another embodiment of the invention, the zeolites may contain fluorine as the F⁻ anions employed as mobilizing agents. The fluorine concentration generally ranges from 0.01 to 1.4% by weight after calcination. However, such fluorine values may be eliminated by a hydrothermal treatment at a pH of less than 7 without thereby modifying the structure of the zeolites of the invention.

TABLE I

| X-ray diffraction pattern | |
|---|---|
| Extreme I/Io values of the $d_{hkl}$ (nm) | |
| 1.120–1.123 F-FF | 0.460–0.464 f |
| 0.992–1.004 F-FF | 0.444–0.449 f |
| 0.973–0.984 f | 0.434–0.439 f |
| 0.896–0.904 ff | 0.422–0.427 f |
| 0.803–0.811 ff | 0.406–0.411 ff |
| 0.742–0.750 ff broad | 0.400–0.403 f |
| 0.703–0.712 ff | 0.3835–0.3875 F |
| 0.667–0.676 f | 0.3805–0.3845 mF |
| 0.633–0.640 f | 0.3780–0.3820 mF |
| 0.595–0.602 mf | 0.3740–0.3780 m |
| 0.590–0.596 f | 0.3715–0.3755 m |
| 0.570–0.576 mf | 0.3710–0.3750 m |
| 0.566–0.572 ff (+ shoulder) | 0.3650–0.3690 f |
| 0.555–0.561 f | 0.3615–0.3650 f |
| 0.535–0.541 f | 0.3480–0.3515 ff broad |
| 0.532–0.538 f | 0.3435–0.3470 f |
| 0.511–0.516 ff broad | 0.3415–0.3450 f |
| 0.502–0.506 ff | 0.3385–0.3422 ff |
| 0.496–0.501 mf | 0.3342–0.3377 f broad |
| 0.486–0.491 ff broad | 0.3295–0.3329 f |
| 0.469–0.474 ff | 0.3245–0.3279 f |

The present invention also features a process for the synthesis of the subject novel zeolites, which comprises:

(i) preparing a reaction mixture, in an aqueous medium, comprising a source of silicon, wherein the silicon is in a state of oxidation of +4, a source of germanium, wherein the germanium is in a state of oxidation of +4, and a structuring agent;

(ii) crystallizing the resulting reaction mixture by heating, and recovering the crystallized precipitate; and (iii) calcining such precipitate at a temperature higher than 450° C. to eliminate the structuring agent occluded in the zeolite cavities.

For a pH higher than about 12, the mobilizer ions are OH⁻ ions. For a pH lower than or equal to 12, F⁻ ions are added as the mobilizing agent.

Generally, it is advisable to avoid the presence of alkali metal or ammonium (NH4+) cations in the reaction medium, which form insoluble germanium compounds, such as, for example, KH₃Ge₂O₆, NH₄H₃Ge₂O₆, Na₂Ge₃O₇.7H₂O, K₃HGe₇O₁₆.xH₂O, K₄Ge₉O₂₀, which inhibit the germanium, thereby preventing or limiting its incorporation into the skeleton of the zeolite.

Numerous sources of silicon having a degree of oxidation of +4 may be used. The following are exemplary: silica hydrogels, aerogels, xerogels, colloidal suspension thereof, the silica produced by precipitation from solutions of soluble silicates, or by hydrolysis of silicic esters such as Si(OC₂H₅)₄, and the silica prepared by the extraction and activation of natural or synthetic crystalline or amorphous compounds, such as aluminum silicates, aluminosilicates, clays, and the like. Hydrolyzable tetravalent silicon compounds, such as silicon halides or the like, may also be used.

Among the sources of germanium at an oxidation degree of +4, for example the quartz oxide GeO₂, hydrolyzable germanium compounds such as the alkoxides, halides, and the like, are representative.

Compounds containing silicon and germanium in combination may also be used, such as, for example, mixed glasses or gels.

The sources of the elements silicon and germanium having oxidation degrees of +4 may be employed in the form of solutions or solids in the powder form, but also as agglomerates, such as for example pellets or extrudates which can be converted into zeolites without a change in form.

The mobilizing agent $OH^-$ is introduced in the form of a weak or strong base or bases, preferably not containing alkali metal or $NH_4^+$ cations. Exemplary thereof are the amines and quaternary ammonium hydroxides.

The mobilizing agent $F^-$ is introduced in the form of an acid and/or a salt devoid of alkali metal or $NH_4^+$ cations, and/or compounds releasing $F^-$ by hydrolysis. Exemplary thereof are hydrofluoric acid, amine fluorohydrates, quaternary ammonium fluorides, $SiF_4$, $GeF_4$, etc.

Structuring agents suitable for use according to the invention are:

(a) amines of the Formula I:

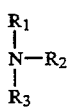 (I)

in which $R_1$, $R_2$, $R_3$, which may be identical or different, are each alkyl radicals, preferably propyl or butyl radicals;

(b) quaternary ammonium compounds of the Formula II:

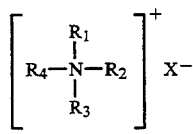 (II)

in which $R_1$, $R_2$, $R_3$, $R_4$, which may be identical or different, are each alkyl radicals, preferably propyl or butyl radicals, and X is an anion; and (c) compounds of Formulae I and II, in which the nitrogen atom has been replaced by a phosphorus atom.

In a preferred embodiment of the invention, the structuring agents are precursors of tetrapropylammonium or tripropylammonium cations.

The structuring agent may be introduced in the form of a base or a salt, depending on the nature of the mobilizer or mobilizers selected, which determines the pH range of the reaction medium.

Thus, in the absence of the $F^-$ anion, the high pH necessary for the synthesis may be attained by the introduction of the structuring agent in the form of a quaternary ammonium hydroxide of Formula II. In contrast, in the presence of $F^-$ anions, the structuring agent may be introduced in the form of a quaternary ammonium salt of Formula II, or an amine of Formula I, with the pH possibly being adjusted by the addition of a base. Advantageously, this base will have weak structuring properties, such as not to compete with the structuring agent added. Thus, bases suitable per the invention are, for example, methylamine, dimethylamine, trimethylamine, ethylamine, diethylamine and triethylamine.

The reaction mixture has the following composition, expressed in terms of molar ratios:

Ge/(Si+Ge) ranging from 0.001 to 0.80, and, preferably, when the pH is higher than 12, ranging from 0.020 to 0.8, more preferably ranging from 0.01 to 0.7, and, when the pH is lower than or equal to 12, ranging from 0.001 to 0.75, preferably from 0.002 to 0.60;

Structuring agent/(Si+Ge) ranging from 0.002 to 4, preferably from 0.06 to 2 for a pH higher than 12, and ranging from 0.06 to 1 for a pH lower than or equal to 12;

F/(Si+Ge) ranging from 0.04 to 4, preferably from 0.06 to 2 for a pH lower than or equal to 12;

$H_2O$/(Si+Ge) ranging from 4 to 400, preferably from 10 to 200 for a pH higher than 12, and ranging from 20 to 200 for a pH lower than or equal to 12.

If a base is used to adjust the pH, the molar ratio of the base relative to (Ge+Si) ranges from 0 to 12, and preferably from 2 to 8.

The addition to the reaction mixture of seed crystallized nuclei of a predetermined structure, for example MFI, in a proportion not exceeding a few percent by weight relative to the $SiO_2 + GeO_2$ contained therein, may facilitate the crystallization of the zeolite.

The crystallization of the zeolite may be effected by heating the reaction mixture to a temperature of from approximately 40° to 240° C., preferably from 60° to 220° C., over that period of time required for the crystallization, according to conventional technique for the synthesis of zeolites, per se well known to this art. For example, the duration of heating may range from about 6 to 500 hours.

The heating and crystallization are preferably carried out in a vessel or autoclave lined with a layer of, for example, polytetrafluoroethane.

The reaction mixture may either be agitated or not.

After crystallization, the resulting precipitate obtained is recovered, for example by filtration.

This precipitate is then heated, after optional drying, to a temperature higher than 450° C., preferably higher than 500° C., to thermally decompose (calcination) the organic species contained in the precipitate, such as, for example, the structuring agent.

The zeolites of the invention have selective adsorption properties.

They may also be used for the catalysis of numerous reactions, such as, for example, disproportionation or alkylation reactions, hydrogenolysis and the hydrogenation of petroleum fractions, and in reforming reactions.

Thus, DE-PS 2,631,391 describes the hydrogenolysis of tetracyclododecane to alkyladamantane in the presence of a molecular sieve containing, in particular, germanium. U.S. Pat. No. 4,394,300 describes disproportionation and alkylation reactions using zeolites of the MFI type, into which germanium atoms have been introduced.

The patents, EP 172,091, DE 3,522,573, FR 2,545,380 and U.S. Pat. No. 4,457,832 provide examples of the use of catalysts containing germanium for hydrogenolysis, hydrogenation of petroleum fractions, or for reforming.

This invention also features a crystalline material of zeolite type, based on silica and germanium oxide, produced by a process comprising:

(i) preparing a reaction mixture, in an aqueous medium, containing at least one source of silicon, wherein the silicon is in the state of oxidation of +4, at least one source of germanium, wherein the germanium is in the state of oxidation of +4, an amount of fluoride ions such that the pH is lower than or equal to 12, and a structuring agent; and (ii) crystallizing the resulting reaction medium and recovering the crystalline precipitate.

The molar ratios of the different species in the reaction medium are those indicated above.

The crystalline precipitate is advantageously washed to eliminate impurities and, in particular, cations or anions not attached to or incorporated within the product structure.

This easily handled product is particularly and principally useful for the production of zeolites by calcination under appropriate conditions, determined as a function of the intended use of the zeolite.

In order to further illustrate the present invention and the advantages thereof, the following specific examples are given, it being understood that same are intended only as illustrative and in nowise limitative.

EXAMPLE 1

This example describes the synthesis of a germanozeosilite in a reaction medium at a pH higher than 12.

14 g of a 40% aqueous solution of tetrapropylammonium hydroxide (TPA-OH) were diluted with 22.5 g water and to this solution were added 3.06 g silica (Aerosil 130 marketed by Degussa) and 2 g of quartz type $GeO_2$.

The mixture was permitted to equilibrate at 60° C. for 2 hours.

The composition, relative to 1 mole of ($SiO_2$+$GeO_2$), was then the following:

0.4 TPA-OH; 0.27 $GeO_2$; 0.73 $SiO_2$; 25 $H_2O$.

This mixture was heated at 160° C. for 3 days in an autoclave.

After cooling, filtration, washing and drying at 80° C., 3.1 g of germanozeosilite crystals were recovered, the size of which was close to one micrometer. After calcination in air at 550° C. overnight, the product was characterized by an X-ray diffraction pattern conforming to that of Table I. The following formula was determined by chemical analysis:

$(Si_{90.95}Ge_{5.05})O_{192}$

EXAMPLE 2

This example describes the synthesis of a zeolite in an acid medium, using $F^-$ as the mobilizing agent.

17 g $SiCl_4$ and 2.15 g $GeCl_4$ were mixed in 20 ml propanol, then 60 g water were added. A gel was produced, which was dried at 60° C. until 10.4 g of product were obtained. This gel was dispersed in an aqueous solution containing 6.65 g tetrapropylammonium bromide (TPA-Br), 7.15 g tripropylamine (Tri-PA), 4 g of a 50% aqueous solution of HF, and the amount of water required to produce the following composition (relative to 1 mole of $SiO_2$): 0.25 TPA-Br; 0.5 Tri-PA; 1 HF; 1 $SiO_2$; 0.1 $GeO_2$; 30 $H_2O$.

In this mixture, 0.12 g of ground crystals with a MFI structure were dispersed as the crystallization nuclei. The reaction medium, having a pH of from 2 to 3, was heated for 15 days at 96° C. After separation from the mother liquor and washing with water, 4.8 g of crystals, containing certain amorphous particles, were obtained, which were calcined for 6 hours under air at 550° C.

The X-ray diffraction pattern obtained for the calcined product conformed to that of Table I. The resulting germanozeosilite had the following formula:

$(Si_{91.3}Ge_{4.7})O_{192}$ and it also contained 0.6% fluorine, by weight.

EXAMPLE 3

$SiCl_4$ and $GeCl_4$ were mixed into 20 g propanol and then 60 g water were added dropwise, under agitation. After 3 hours, the gel produced was dried at 85° C. and then redispersed in an aqueous solution containing HF, tripropylamine (Tri-PA) and tetrapropylammonium bromide (TPA-Br). The conditions of this example are reported in Table II.

EXAMPLES 4 AND 5

A solution A containing $GeCl_4$ and a 5% aqueous solution of HF were prepared.

An aqueous solution B containing methylamine and tetrapropylammonium bromide (TPA-Br) was also prepared. The solutions A and B were mixed together by pouring A into B, under agitation.

Into the gel produced, after 30 min of agitation, silica (Aerosil 130) and crystallization nuclei were dispersed.

The amounts used, the molar compositions of the two Examples 4 and 5, the crystallization conditions and the results obtained are reported in Table III.

EXAMPLE 6

An experiment was carried out under the conditions of Example 4 (Table III), except that the hydrofluoric acid solution was replaced by water. Under these conditions, the resulting final product was amorphous. This example clearly demonstrates the importance of the $F^-$ ions at a pH of lower than 12.

TABLE II

| | Example 3 |
|---|---|
| $SiCl_4$ | 6.37 g |
| $GeCl_4$ | 2.68 g |
| Weight of gel dried at 85% | 3 g |
| $H_2O$ | 27 g |
| HF at 50% | 0.86 ml |
| Tri-PA | 3.58 g |
| TPA-Br | 3.33 g |
| Weight of seed crystals | 0.06 g |
| Composition of the reaction mixture relative to 1 (Si + Ge) | 0.25 TPA-Br; 0.5 Tri-PA; 0.5 HF; 0.75 $SiCl_4$; 0.25 $GeCl_4$; 30 $H_2O$ |
| pH | 6-7 |
| Heating temperature | 95° C. |
| Heating duration | 12 days |
| Weight of crystals obtained | 2.6 g |
| Nature of phases | pure germanozeosilite (% Ge = 10.93) by weight |

TABLE III

| | Example 4 | Example 5 |
|---|---|---|
| | Solution A | Solution A |
| 50% HF in water | 0.4 g | 0.4 g |
| $GeCl_4$ | 1.07 g | 2.14 g |
| | Solution B | Solution B |
| $H_2O$ | 7 g | 5 g |
| $CH_3NH_2$, 40%, in water | 3.10 g | 6.2 g |
| TPA-Br | 1.33 g | 1.33 g |
| | Additions to the gel | |
| $SiO_2$ (Aerosil 130) | 0.9 g | 0.6 g |
| Nuclei | 0.015 g | 0.015 g |
| Molar composition (relative to 1 (Ge + Si)) | 0.25 TPA-Br; 0.5 HF 2 $CH_3NH_2$; 0.25 $GeCl_4$; 0.75 $SiO_2$; 25 $H_2O$ | 0.25 TPA-Br; 0.5 HF; 4 $CH_3NH_2$; 0.5 $GeCl_4$ 0.5 $SiO_2$; 25 $H_2O$ |
| pH (initial–final) | 10.5–9 | 11–9.5 |
| 0° C./duration | 180° C./15 h | 180° C./15 h |

TABLE III-continued

| | Example 4 | Example 5 |
|---|---|---|
| Weight of crystals | 1.1 g | 1 g |
| Nature of product obtained | pure germanozeosilite | pure germanozeosilite |
| Number of Ge/96 (Ge + Si) | 17.13 | 32.8 |
| Volume of network (nm³) | 5.39 | 5.42 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents therof.

What is claimed is:

1. A calcined zeolite based on silica and germanium oxide and having the following general formula:

$$(Si_{96-x}Ge_x)O_{192}$$

in which x ranges from 0.1 to about 36.

2. The calcined zeolite as defined by claim 1, having an MFI type structure.

3. The calcined zeolite as defined by claim 1, further comprising from 0.01 to 1.4% by weight of fluorine values.

4. The calcined zeolite as defined by claim 1, having the X-ray diffraction pattern shown in Table I.

5. The calcined zeolite as defined by claim 1, having the formula:

$$(Si_{90.95}Ge_{5.05})O_{192}.$$

6. The calcined zeolite as defined by claim 1, having the formula:

$$(Si_{91.3}Ge_{4.7})O_{192}.$$

7. A process for the preparation of the calcined zeolite as defined by claim 1, comprising:
   (i) preparing a reaction mixture, substantially in the absence of trivalent elements, in an aqueous medium, including a source of silicon, wherein the silicon is in a state of oxidation of +4, a source of germanium, wherein the germanium is in a state of oxidation of +4, and a structuring agent;
   (ii) heating and crystallizing such reaction mixture, and separating the resulting crystallized precipitate therefrom; and
   (iii) calcining the separated precipitate at a temperature higher than 450° C.

8. The process as defined by claim 7, wherein said reaction mixture has a pH of 12 or less and which further comprises fluoride ions, and also wherein the molar ratio Ge/(Si+Ge) ranges from 0.001 to 0.80, the molar ratio F/(Si+Ge) ranges from 0.04 to 4, and the molar ratio structuring agent/(Si+Ge) ranges from 0.002 to 4.

9. The process as defined by claim 7, wherein said reaction mixture has a pH of greater than 12, and also wherein the molar ratio Ge/(Si+Ge) ranges from 0.002 to 0.80.

10. The process as defined by claim 9, said molar ratio Ge/(Si+Ge) ranging from 0.01 to 0.70.

11. The process as defined by claim 8, said molar ratio Ge/(Si+Ge) ranging from 0.001 to 0.75.

12. The process as defined by claim 11, said molar ratio Ge/(Si+Ge) ranging from 0.002 to 0.60.

13. The process as defined by claim 8, said molar ratio F/(Si+Ge) ranging from 0.06 to 2.

14. The process as defined by claim 13, said molar ratio structuring agent/(Si+Ge) ranging from 0.06 to 1.

15. The process as defined by claim 9, said molar ratio structuring agent/(Si+Ge) ranging from 0.06 to 2.

16. The process as defined by claim 7, wherein said reaction medium the molar ratio H₂O/(Si+Ge) ranges from 4 to 400.

17. The process as defined by claim 8, wherein said reaction medium the molar ratio H₂O/(Si+Ge) ranges from 20 to 200.

18. The process as defined by claim 9, wherein said reaction mixture the molar ratio H₂O/(Si+Ge) ranges from 10 to 200.

19. The process as defined by claim 7, comprising controlling the pH of the reaction medium by adding a base thereto which contains no alkali metal or ammonium ions.

20. The process as defined by claim 19, said base is methylamine, dimethylamine, trimethylamine, ethylamine, diethylamine or triethylamine.

21. The process as defined by claim 19, wherein said reaction medium the molar ratio base/(Si+Ge) ranges from greater than 0 to 12.

22. The process as defined by claim 21, said molar ratio base/(Si+Ge) ranging from 2 to 8.

23. The process as defined by claim 7, said reaction mixture is a common source of silica and germanium oxide.

24. The process as defined by claim 7, said structuring agent is:

(a) an amine of the Formula I:

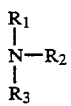

(I)

in which R₁, R₂, R₃, which may be identical or different, are each an alkyl radical;

(b) a quaternary ammonium compound of the Formula II:

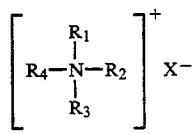

(II)

in which R₁, R₂, R₃, R₄, which may be identical or different, are each an alkyl radical, and X is an anion; or (c) a compound of Formulae I or II, in which the nitrogen atom is replaced by a phosphorus atom.

25. The process as defined by claim 7, said source of silica is a hydrogel, aerogel, xerogel, colloidal suspension of silica, silicic ester, water-soluble silicate, a silica extracted from natural or synthetic crystalline compounds, or a tetravalent hydrolyzable silicon compound.

26. The process as defined by claim 7, said source of germanium oxide is a quartz type germanium oxide, or a hydrolyzable germanium compound.

27. The process as defined by claim 26, said source of germanium oxide is a germanium halide or alkoxide.

28. The process as defined by claim 24, said common source of silica and germanium oxide are a glass based on silica and germanium oxide, or a mixed gel thereof.

29. The process as defined by claim 8, said fluoride values is hydrofluoric acid, an amine or quaternary ammonium fluorohydrate or a hydrolyzable compound releasing fluoride ions.

30. The process as defined by claim 29, said hydrolyzable compound comprising a fluoride salt containing a silicon or germanium fluoride.

31. A process for the preparation of a crystalline compound of silica and germanium oxide, comprising:
(i) preparing a reaction mixture, substantially in the absence of trivalent elements, in an aqueous medium, containing at least one source of silicon, wherein the silicon is in the state of oxidation of +4, at least one source of germanium, wherein the germanium is in the state of oxidation of +4, an amount of fluoride ions such that the pH of the reaction mixture is lower than or equal to 12, and a structuring agent; and
(ii) crystallizing such reaction medium and recovering the resulting crystalline precipitate therefrom.

32. The process as defined by claim 31, wherein said reaction mixture the molar ratio Ge/(Si+Ge) ranges from 0.001 to 0.8, the molar ratio F/(Si+Ge) ranges from 0.4 to 4, and the molar ratio structuring agent/(Si+Ge) ranges from 0.002 to 4.

33. The product of the process as defined by claim 31.

34. An adsorbent comprising the calcined zeolite as defined by claim 1.

35. A catalyst or catalyst support comprising the calcined zeolite as defined by claim 1.

36. In a catalyzed hydrogenolysis, hydrogenation or reforming reaction, the improvement which comprises utilizing as the catalyst therefor, under process conditions of hydrogenolysis, hydrogenation or reforming the calcined zeolite as defined by claim 1, to form a hydrogenolysis product, hydrogenation product or reforming product.

37. The process as defined by claim 7 wherein said reaction mixture does not include alkali metal or ammonium cations.

* * * * *